United States Patent
Lai et al.

(10) Patent No.: US 10,990,296 B2
(45) Date of Patent: *Apr. 27, 2021

(54) PRIORITY-BASED DATA MOVEMENT

(71) Applicant: Western Digital Technologies, Inc., San Jose, CA (US)

(72) Inventors: Yun-Tzuo Lai, Irvine, CA (US); Haining Liu, Irvine, CA (US); Subhash Balakrishna Pillai, Irvine, CA (US)

(73) Assignee: WESTERN DIGITAL TECHNOLOGIES. INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/695,052

(22) Filed: Nov. 25, 2019

(65) Prior Publication Data

US 2020/0097187 A1 Mar. 26, 2020

Related U.S. Application Data

(63) Continuation of application No. 15/604,575, filed on May 24, 2017, now Pat. No. 10,503,412.

(51) Int. Cl.
*G06F 3/06* (2006.01)

(52) U.S. Cl.
CPC .......... *G06F 3/0616* (2013.01); *G06F 3/0647* (2013.01); *G06F 3/0656* (2013.01); *G06F 3/0659* (2013.01); *G06F 3/0679* (2013.01)

(58) Field of Classification Search
CPC .... G06F 3/0616; G06F 3/0626; G06F 3/0647; G06F 3/0656; G06F 3/0658; G06F 3/0659; G06F 3/0679
See application file for complete search history.

(56) References Cited

U.S. PATENT DOCUMENTS

2008/0235480 A1* 9/2008 Traister ............... G06F 9/30043
711/167
2008/0294814 A1 11/2008 Gorobets
(Continued)

FOREIGN PATENT DOCUMENTS

| CN | 103176746 A | 6/2013 |
| CN | 103809917 A | 5/2014 |

(Continued)

*Primary Examiner* — Larry T Mackall
(74) *Attorney, Agent, or Firm* — Morgan, Lewis & Bockius LLP

(57) ABSTRACT

A data storage device that provides priority-based internal data movement includes a controller communicatively coupled to volatile memory and to non-volatile memory circuits, where the controller is configured to queue requests in a plurality of queues in the volatile memory, where each of the requests is associated with one of a plurality of internal data movement command types. The controller is also configured to select one of the plurality of queues based on a prioritization of the plurality of internal data movement command types. The controller is also configured to determine that the selected queue includes at least one request of the associated internal data movement command type. The controller is also configured to issue the at least one request from the selected queue to at least one of the non-volatile memory circuits.

20 Claims, 5 Drawing Sheets

(56) References Cited

U.S. PATENT DOCUMENTS

2014/0181370 A1 6/2014 Cohen
2017/0249191 A1 8/2017 Chang

FOREIGN PATENT DOCUMENTS

| CN | 104731981 A | 6/2015 |
| CN | 105468305 A | 4/2016 |
| CN | 105867844 A | 8/2016 |
| CN | 106527967 A | 3/2017 |

* cited by examiner

PRIORITY-BASED DATA MOVEMENT

CROSS-REFERENCE TO RELATED APPLICATION

This application is a continuation application of application Ser. No. 15/604,575, filed on May 24, 2017, now U.S. Pat. No. 10,503,412, the entirety of which is incorporated herein by reference.

BACKGROUND

The present description relates generally to data transfer within data storage devices including priority-based internal data movement for non-volatile memory devices.

Flash memory enjoys a number of advantages over other types of storage devices. Flash memory generally offers faster read access times and better shock resistance than a hard disk drive (HDD). Unlike dynamic random access memory (DRAM), flash memory is non-volatile, meaning that data stored in a flash storage device is not lost when power to the device is removed. These advantages, and others, may explain the increasing popularity of flash memory for storage applications in devices such as memory cards, USB flash drives, mobile phones, digital cameras, mass storage devices, MP3 players and the like.

In a flash memory system, various types of internal maintenance operations are performed during operation of the flash memory system. For example, internal data movements to free up available memory space, relocate data from error-prone memory locations, and/or move data to lesser worn memory locations are all housekeeping operations available to ensure performance and endurance of the flash memory.

SUMMARY

The subject technology provides for prioritization of the plurality of internal data movement command types (e.g., garbage collection, data relocation, wear leveling) in a certain order to provide optimal performance and endurance for a data storage device. The wear leveling requests and data relocation requests may be logically grouped together, where the data relocation requests are given higher priority over the wear leveling requests. Requests from this logical grouping are picked in a round robin fashion with the garbage collection requests. When the logical grouping of the data relocation requests and the wear leveling requests has a turn in the round robin order, a wear leveling request may be selected only after all existing data relocation requests have been serviced. With this approach, the garbage collection requests are given enough priority to ensure continuous operation of the data storage device. At the same time, the data relocation requests and the wear leveling requests are given consideration to ensure endurance of the data storage device.

In another aspect, a data storage device that provides priority-based internal data movement includes a plurality of queues, and a plurality of processors, where each of the plurality of processors configured to queue one or more requests associated with a respective one of a plurality of internal data movement command types. In some aspects, each of the one or more requests being queued into one of the plurality of queues for the associated internal data movement command type. The data storage device also includes a scheduler communicably coupled to the plurality of queues, and the scheduler is configured to identify a turn among the plurality of internal data movement command types based on a prioritization of the plurality of internal data movement command types. The scheduler is also configured to select one of the plurality of queues based on the identified turn, and issue one of the queued requests of the selected queue based on the associated internal data movement command type. In some aspects, the queued request is issued to at least one of a plurality of non-volatile memory circuits.

In another aspect, a system includes non-volatile memory circuits and a volatile memory including a plurality of queues. The system also includes a controller communicatively coupled to the volatile memory and to the non-volatile memory circuits, where the controller is configured to queue requests in the plurality of queues, each of the requests being associated with one of a plurality of internal data movement command types. The controller is also configured to select one of the plurality of queues based on a prioritization of the plurality of internal data movement command types. The controller is also configured to determine that the selected queue includes at least one request of the associated internal data movement command type. The controller is also configured to issue the at least one request from the selected queue to at least one of the non-volatile memory circuits.

In another aspect, a method of providing priority-based internal data movement includes queuing requests in a plurality of queues in volatile memory, where each of the requests is associated with one of a plurality of internal data movement command types. The method also includes selecting one of the plurality of queues based on a prioritization of the plurality of internal data movement command types. The method also includes determining that the selected queue includes at least one request of the associated internal data movement command type. The method also includes issuing the at least one request from the selected queue to at least one non-volatile memory circuit.

In another aspect, a system that provides priority-based internal data movement includes means for queuing one or more requests associated with a respective one of a plurality of internal data movement command types, where each of the one or more requests is queued in one of a plurality of queues for the associated internal data movement command type. The system also includes means for identifying a turn among the plurality of internal data movement command types based on a prioritization of the plurality of internal data movement command types. The system also includes means for selecting one of the plurality of queues based on the identified turn. The system also includes means for issuing one of the queued requests from the selected queue to at least one of a plurality of non-volatile memory circuits.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
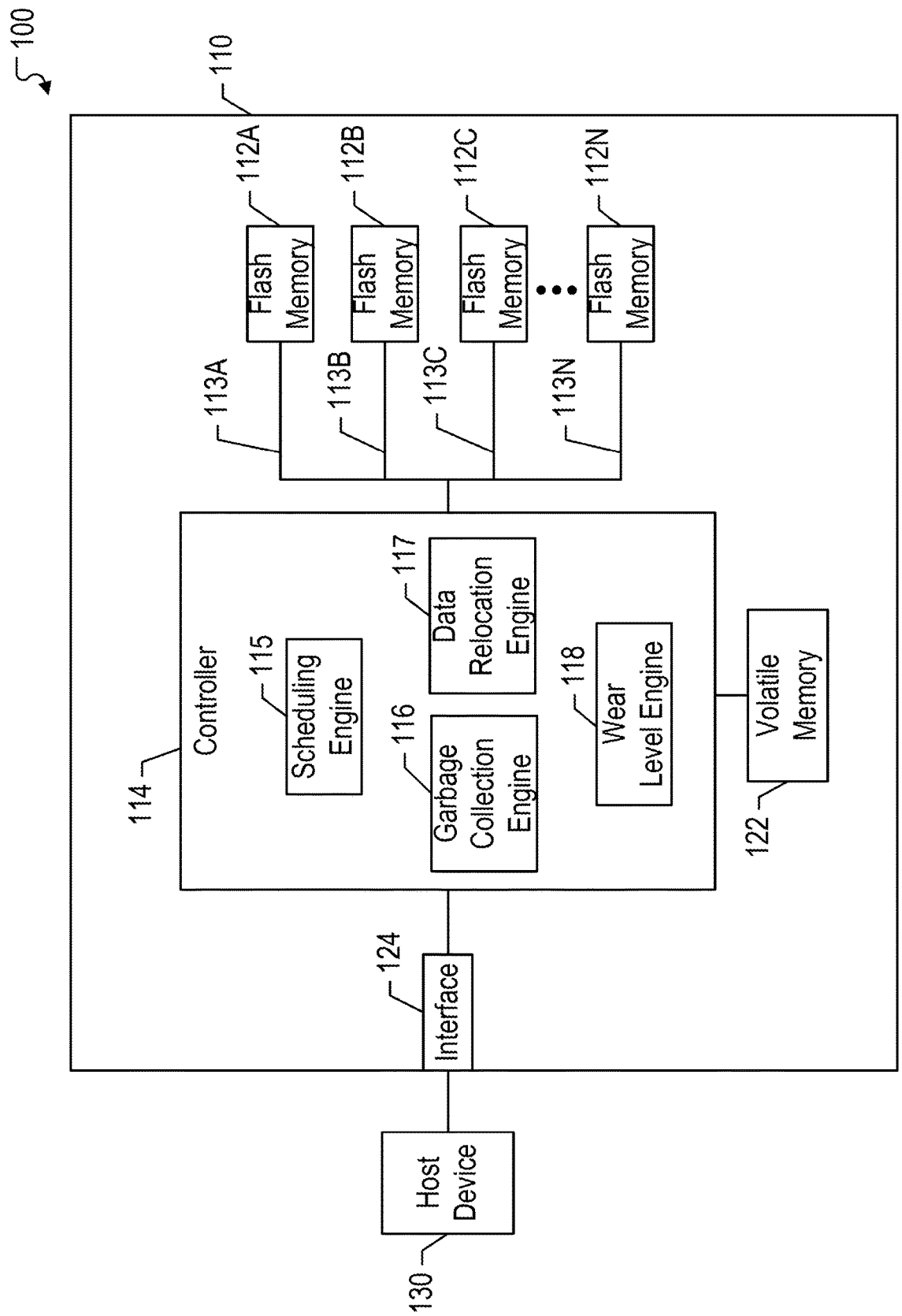
FIG. 1 illustrates an example data storage system that may implement a system for priority-based internal data movement in accordance with one or more implementations.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

Solid State Drives (SSD) are manufactured using flash memory cell architectures. Flash memory is an improved form of Electrically-Erasable Programmable Read-Only Memory (EEPROM). Traditional EEPROM devices are only capable of erasing or writing one memory location at a time. In contrast, flash memory allows multiple memory locations to be erased or written in one programming operation. Flash memory may thus operate at higher effective speeds than traditional EEPROM.

A memory controller performs internal maintenance operations to manage the performance of the flash memory system. For example, internal data movements help free up available memory space, help relocate data from error-prone memory locations, and/or help move data to lesser worn memory locations to maintain the performance and endurance of the flash memory system. One type of internal data movement is garbage collection. Garbage collection is a maintenance feature of SSD to ensure that sufficient erased/unprogrammed blocks are available for writing incoming data from a host. Data is written to the flash memory in physical pages. However, the flash memory can only be erased in larger units of blocks (made up of multiple pages). In this respect, the garbage collection is performed to erase blocks containing pages that have been marked invalid and be subsequently written to again. For example, if the data in some of the pages of the block are invalid, only the pages with valid data in that block are read and rewritten into an erased block. The block is then erased to be made available for future write operations.

Another type of internal data movement is wear leveling. The wear leveling ensures the flash memory is worn evenly across all the blocks in the SSD. At any given time, all flash memory blocks may maintain program/erase (P/E) cycle counts between a minimum and maximum value. Wear leveling achieves this by moving cold data (which are sectors of data updated rarely) from blocks with smaller erase counts to blocks with higher erase counts, and by writing hot data (which are sectors of data updated frequently) to blocks with lower erase counts.

Another type of internal data movement is data relocation due to data operation errors. The relocation of data due to the data operation read/write errors is a housekeeping operation to move all data out of blocks (or block sets) after the occurrence of certain types of read/write errors in those blocks. For example, the data relocation may be triggered for a block when the bit error count for the block exceeds a predetermined error count threshold.

These internal data movement commands may be issued during the operation of the SSD. Garbage collection maintains the availability of free blocks for continuous operation of the SSD. Wear leveling maintains the endurance of the SSD. The relocation of data maintains the data integrity in the SSD in the event of certain read/write error occurrences. Requests for all these types of data movements could be outstanding on multiple blocks at the same time. Certain internal data movements may be more critical to the operation of the SSD than others, thus, performing these data movements in the same order of receiving these requests or in a round robin order between all these types of internal data movements has been found to be less optimal for maintaining the data integrity in the SSD. Rather, performing these data movements in an optimal order is desirable for continuous operation of the SSD with optimum performance and endurance.

The subject technology provides for prioritization of the internal data movement command types (e.g., garbage collection, data relocation, wear leveling) such that the internal data movement commands that are more critical to the operation of the SSD than others are issued in a certain order and, thus increasing the performance and endurance for a data storage device. The wear leveling requests and data relocation requests may be logically grouped together, where the data relocation requests are given higher priority over the wear leveling requests. Requests from this logical grouping may be selected in a round robin fashion with the garbage collection requests. When the logical grouping of the data relocation requests and the wear leveling requests has a turn in the round robin order, a wear leveling request may be selected after all existing data relocation requests have been serviced. With this approach, the garbage collection requests are given enough priority to ensure continuous operation of the data storage device. At the same time, the data relocation requests and the wear leveling requests are given consideration to ensure endurance of the data storage device.

In some implementations, a data storage device that provides priority-based internal data movement includes queues, and processors, where each of the processors configured to queue one or more requests associated with a respective one of internal data movement command types (e.g., garbage collection, data relocation, wear leveling). In some aspects, each of the one or more requests is queued into one of the queues for the associated internal data movement command type. The data storage device also includes a scheduler communicably coupled to the queues, and the scheduler is configured to identify a turn among the internal data movement command types based on a prioritization of the internal data movement command types. The scheduler is also configured to select one of the queues based on the identified turn, and issue one of the internal data movement command types from one of the queued requests of the selected queue. In some aspects, the internal data movement command type is issued to at least one of non-volatile memory circuits.

FIG. 1 illustrates an example data storage system 100 that may implement a system for priority-based internal data movement in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The system 100 includes a data storage device 110 and a host device 130. The data storage device 110 includes one or more flash memory circuits 112A-N, one or more channels 113A-N, a controller 114, volatile memory 122, an interface 124. The controller 114 includes a scheduling engine 115, a garbage collection engine 116, a data relocation engine 117, and a wear level engine 118. The controller 114 may include one or more decoders (not shown), such as error-correcting code (ECC) decoders, one or more encoders (not shown), such as ECC encoders. The one or more decoders and/or the one or more encoders may be one or more dedicated circuits of the controller 114, may be implemented via firmware running on the controller 114, and/or may be one or more circuits separate from the controller 114. As used herein, the term "flash memory circuit" may be used interchangeably with the term "non-volatile memory circuit."

The processor of controller 114 may be a general-purpose microprocessor, a multi-core processor, a microcontroller, a digital signal processor (DSP), an application specific integrated circuit (ASIC), a field programmable gate array (FPGA), a programmable logic device (PLD), a controller, a state machine, gated logic, discrete hardware components, or a combination of the foregoing. One or more sequences of instructions executed by controller 114 and/or its processor may be stored and read from the volatile memory 122 or the one or more flash memory circuits 112A-N, electronic media, optical media, magnetic media, or other type(s) of storage media. These storage media represent examples of tangible and/or non-transitory machine or computer readable media on which instructions/code executable by controller 114 and/or its processor may be stored. In some implementations, the instructions may be received from the host device 130 (for example, via the interface 124).

The volatile memory 122 may comprise random access memory (RAM), static random-access memory (SRAM), dynamic random-access memory (DRAM), synchronous dynamic random-access memory (SDRAM), such as DDR3, or any combination thereof.

The one or more flash memory circuits 112A-N may include, according to various aspects, one or more flash integrated circuits, Chalcogenide RAM (C-RAM), Phase Change Memory (PC-RAM or PRAM), Programmable Metallization Cell RAM (PMCRAM or PMCm), Ovonic Unified Memory (OUM), Resistance RAM (RRAM), NANO memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete NVM (non-volatile memory) chips, or any combination thereof. The data storage device 110 may further include other types nonvolatile and/or volatile storage, such as magnetic storage.

The interface 124 of the data storage device 110 couples the data storage device 110 to the host device 130. The interface 124 may be a wired interface, such as a Peripheral Component Interface Controller (PCIC) interface, a Personal Computer Memory Card International Association (PCMCIA) interface, a Serial AT Attachment (SATA) interface, a universal serial bus (USB) interface, or generally any wired interface. Alternatively, or in addition, the interface 124 may be a wireless interface, such as wireless SATA, Bluetooth, or generally any wireless interface.

The channels 113A-N may each communicatively couple one or more of the flash memory circuits 112A-N to the controller 114. In one or more implementations, the channels 113A-N may be directly coupled to the controller 114, e.g. The channels 113A-N may be wired interfaces.

In the system 100, the channel 113A is communicatively coupled to the flash memory circuit 112A, the channel 113B is communicatively coupled to the flash memory circuit 112B, the channel 113C is communicatively coupled to the flash memory circuit 112C, and the channel 113N is communicatively coupled to the flash memory circuit 112N. Although the channels 113A-N are illustrated in the system 100 as each being communicatively coupled to one of the flash memory circuits 112A-N, each of the channels 113A-N may be communicatively coupled to multiple of the flash memory circuits 112A-N as is discussed further below with respect to FIG. 2. When multiple of the flash memory circuits 112A-N are coupled to a single one of the channels 113A-N, only one of the flash memory circuits 112A-N may be able to transmit or receive data over the channel at any given time.

Each of the channels 113A-N may be implemented using one or more physical I/O buses coupled between one of the flash memory interfaces and the corresponding flash memory circuit(s). Each channel allows the corresponding flash memory interface to send read, write and/or erase commands to the corresponding flash memory device. Each flash memory interface may include a register (e.g., First-In-First-Out (FIFO) register) that queues read, write and/or erase commands from the controller 114 for the corresponding flash memory device. Although the term "channel," as used above, referred to the bus coupled between a flash memory interface and the corresponding flash memory device, the term "channel" may also refer to the corresponding flash memory device that is addressable.

The channels 113A-N may each be associated with a maximum bandwidth and/or throughput. Similarly, the interface 124 may also be associated with a maximum bandwidth and/or throughput. Thus, there may be bandwidth/throughput limitations on the amount of data that can be transferred and/or over each of the channels 113A-N at any given time. Furthermore, each of the flash memory circuits 112A-N may be capable of processing only a single command, e.g. a write command or a read command, at any given time.

The controller 114 may be operable to read data from, and write data to, the flash memory circuits 112A-N via the channels 113A-N. For example, the controller 114 receives data, such as a stream of data, from the host device 130 via the interface 124, where the data may be then written to one or more of the flash memory circuits 112A-N via one or more of the channels 113A-N.

The controller 114 may utilize the volatile memory 122 to queue system data and/or host data that are intended to be stored in the flash memory circuits 112A-N. For example, the volatile memory 122 may be used as a buffer for rate control, or may otherwise be used to store information (e.g., queues, variables, physical block status, logical to physical address mapping tables, endurance/retention data, settings, etc.) utilized by the controller 114 to read/write data to/from the flash memory circuits 112A-N. Since the volatile memory 122 may be volatile memory, the controller 114 may write from the volatile memory 122 to the flash memory circuits 112A-N to permanently store information in one or more of the flash memory circuits 112A-N. When the data storage device 110 is powered on, the controller 114 may retrieve the information from the one or more flash memory circuits 112A-N and store the information in the volatile memory 122. The volatile memory 122 may be part of the controller 114 in some implementations, or the volatile memory 122 may be a separate component and communicably coupled to the controller 114 in other implementations.

Storage access commands communicated by the interface 124 may include read and write commands issued by the host device 130. Read and write commands may specify a logical address (e.g., logical block addresses or LBAs) used to access the data storage device 110.

In some implementations, the data storage device 110 maintains a map or mapping between logical addresses used by host device 130 and physical memory locations in the one or more flash memory circuits 112A-N. The mapping may be structured to provide a look-up of a physical address corresponding to a logical address, and the mapping may be indexed based on the logical addresses (and/or based on physical addresses). The size of the smallest unit written by the host device 130 to data storage device 110 may be different than the smallest data unit stored in the one or more flash memory circuits 112A-N by the data storage device 110. For example, the data units of the data storage device 110 may be 4 kilobytes in size and the host data segments written by the host device 130 may be 512 bytes in size. The mapping between logical addresses used by the host device 130 and the physical memory locations in the one or more flash memory circuits 112A-N may account for this difference.

The mapping may be maintained as a table and/or any other suitable data structure. Physical memory location corresponding to a given logical address (e.g., LBA) may change as a result of host data being moved. For example, host data may be moved within the one or more flash memory circuits 112A-N due to one or more housekeeping operations, such as garbage collection (e.g., reclaiming memory space used by invalid data), wear leveling (e.g., spreading out the write load substantially evenly across physical pages and/or blocks), memory refresh (e.g., periodically refreshing stored data), bad block management (e.g., discovering and not using for storage unreliable data blocks), etc. In addition, when the host device 130 writes data for a particular logical address, the mapping for this logical address may change due to the data being stored in a different physical memory location. For example, the host device 130 may store data for an LBA to the data storage system 110, which is then stored by the data storage device 110 in a first physical address. At a later time, updated data for the LBA may be received from the host device 130, causing the data stored at the corresponding first physical address to become invalid.

The flash memory circuits 112A-N may each include physical blocks, such as NAND blocks and/or NOR blocks. The physical blocks may each include physical pages to which data may be written to or read from. Although the physical pages of the blocks of the flash memory circuits 112A-N can be individually written to (e.g., a physical page being a unit for read/write operations), the physical pages of a block of the flash memory circuits 112A-N cannot be individually erased. Instead, a page of a block can only be erased, and subsequently rewritten to, by erasing all of the pages of the block (e.g., a block being a unit for erase operations). Thus, as data is moved from a page of a block, or the data is deleted, the page may be marked invalid and cannot be reused until the entire block is erased.

For example, when the garbage collection engine 116 identifies a block of one of the flash memory circuits 112A-N, such as the flash memory circuit 112A, that includes invalid pages, the garbage collection engine 116 may issue a sequence of commands (e.g., read, write, erase commands). For example, the garbage collection engine 116 may facilitate the garbage collection operation by initiating a request to issue a garbage collection command, and adds the request for the garbage collection command (and/or an indicator thereof) to a garbage command collection queue. The garbage collection command may identify one or more valid pages of a block of the flash memory circuit 112A to read the data from, write the valid pages to a new block of the flash memory circuits 112A-N, and erase the old block of the flash memory circuit 112A.

The scheduling engine 115 obtains the request for the garbage collection command from the garbage collection command queue based on a prioritization of the garbage collection operation, and places the garbage collection command on one or more of the channels 113A-N according to the prioritization. For example, the scheduling engine 115 may issue the sequence of garbage collection commands to the flash memory circuit 112A over the channel 113A. Any one of the flash memory circuits 112A-N may receive a garbage collection read command and processes the read command when resources are available. Since the flash memory circuit 112A may only be able to process one command at a time, the read command may be processed by the flash memory circuit 112A when it is received or may be processed some amount of time after it is received. If there is valid data, a write operation may be performed. The flash memory circuit 112A may receive a garbage collection write command and processes the write command to write the valid data. For example, the flash memory circuit 112A may write valid data to pages of another block of the flash memory circuit 112A, if such a block is available.

The data relocation engine 117 may receive one or more error detection signals from a decoder (not shown) of the controller 114. The error detection signals may indicate that certain types of read/write errors are occurring in one or more blocks of one of the flash memory circuits 112A-N, such as the flash memory circuit 112A. The reoccurrence of such read/write errors may render the one or more blocks inoperable, thus making it necessary to move all data out of the identified one or more blocks to other blocks. The data relocation engine 117 may initiate a request to issue a data relocation command, and adds the request for the data relocation command (and/or an indicator thereof) to a data relocation queue. The data relocation command may identify physicals block of the flash memory circuits 112A from which valid data is moved.

The scheduling engine 115 obtains the request for the data relocation command from the data relocation queue based on a prioritization of the data relocation operation, and places the data relocation command on one or more of the channels 113A-N according to the prioritization. For example, the scheduling engine 115 may issue the data relocation command to the flash memory circuit 112A over the channel 113A. The flash memory circuit 112A may receive a data relocation read command and processes the read command when resources are available. Since the flash memory circuit 112A may only be able to process one command at a time, the read command may be processed by the flash memory circuit 112A when it is received or may be processed some amount of time after it is received. Alternatively and/or in addition, the flash memory circuit 112A may write the data to pages of another block of the flash memory circuit 112A, if such a block is available.

The wear level engine 118 may obtain information on retention time and erase (P/E) counts that is stored in system data of the data storage device 110. The wear level engine 118 may identify one or more blocks containing cold data with a relatively low erase count and one or more blocks containing hot data with a relatively high erase count from blocks of one of the flash memory circuits 112A-N, such as the flash memory circuit 112A. The wear level engine 118 maintains erase counts between a minimum threshold and a maximum threshold by moving data from blocks with low erase counts to other blocks with high erase counts, and vice versa, depending on the rate that data is being updated. At any time, the wear level engine 118 may move cold data from a block with a relative low erase count to another block with a relatively high erase count because the cold data does not create a high number of write/erase transactions with a block. On the other hand, the wear level engine 118 may move hot data from a block with a relative high erase count to another block with a relatively low erase count because the hot data requires more write/erase transactions with a block. By moving cold data from blocks with low erase counts, more blocks become available for hot data to be moved to these lower erase count blocks to facilitate an even wear of the low erase count blocks. Similarly, by moving cold data to blocks with high erase counts, the wear on the high erase count blocks may progress more evenly.

The wear level engine 118 may initiate a request to issue a wear leveling command, and adds the request for the wear leveling command (and/or an indicator thereof) to a wear leveling queue. The wear leveling command may identify physical blocks of the flash memory circuit 112A from which hot data and/or cold data is moved.

The scheduling engine 115 obtains the request for the wear leveling command from the wear leveling queue based on a prioritization of the wear leveling operation, and places the wear leveling command on one or more of the channels 113A-N according to the prioritization. For example, the scheduling engine 115 may issue the wear leveling command to the flash memory circuit 112A over the channel 113A. The flash memory circuit 112A may receive a wear leveling read command and processes the read command when resources are available. Since the flash memory circuit 112A may only be able to process one command at a time, the read command may be processed by the flash memory circuit 112A when it is received or may be processed some amount of time after it is received. Alternatively and/or in addition, the flash memory circuit 112A may write the data (e.g., hot data) to pages of another block of the flash memory circuit 112A (e.g., block with a lower erase count), if such a block is available.

The scheduling engine 115 may process requests queued by the garbage collection engine 116, the data relocation engine 117 and the wear level engine 118 in the same order of receiving these requests or in a round robin order between the internal data movement command types. However, serving the requests in the order received or in the round robin order does not allow more critical operations to be serviced in a timely manner, thus impinging on the data integrity of the data storage device 110.

In this respect, the scheduling engine 115 prioritizes the internal data movement command types (e.g., garbage collection, data relocation, wear leveling) such that operations that are more critical to the operation than others are issued in a more timely manner and, thus increasing the performance and endurance of the data storage device 110. The scheduling engine 115 may logically group together the wear leveling requests and data relocation requests, where the data relocation requests are given higher priority over the wear leveling requests. Requests from this logical grouping are picked in a round robin fashion with the garbage collection requests. When the logical grouping of the data relocation requests and the wear leveling requests has a turn in the round robin order, a wear leveling request may be selected after all existing data relocation requests have been serviced (or when the data relocation command queue is empty). With this approach, the garbage collection requests are given enough priority to ensure continuous operation of the data storage device 110. At the same time, the data relocation requests and the wear leveling requests are given consideration to ensure endurance of the data storage device 110.

Figure 2:
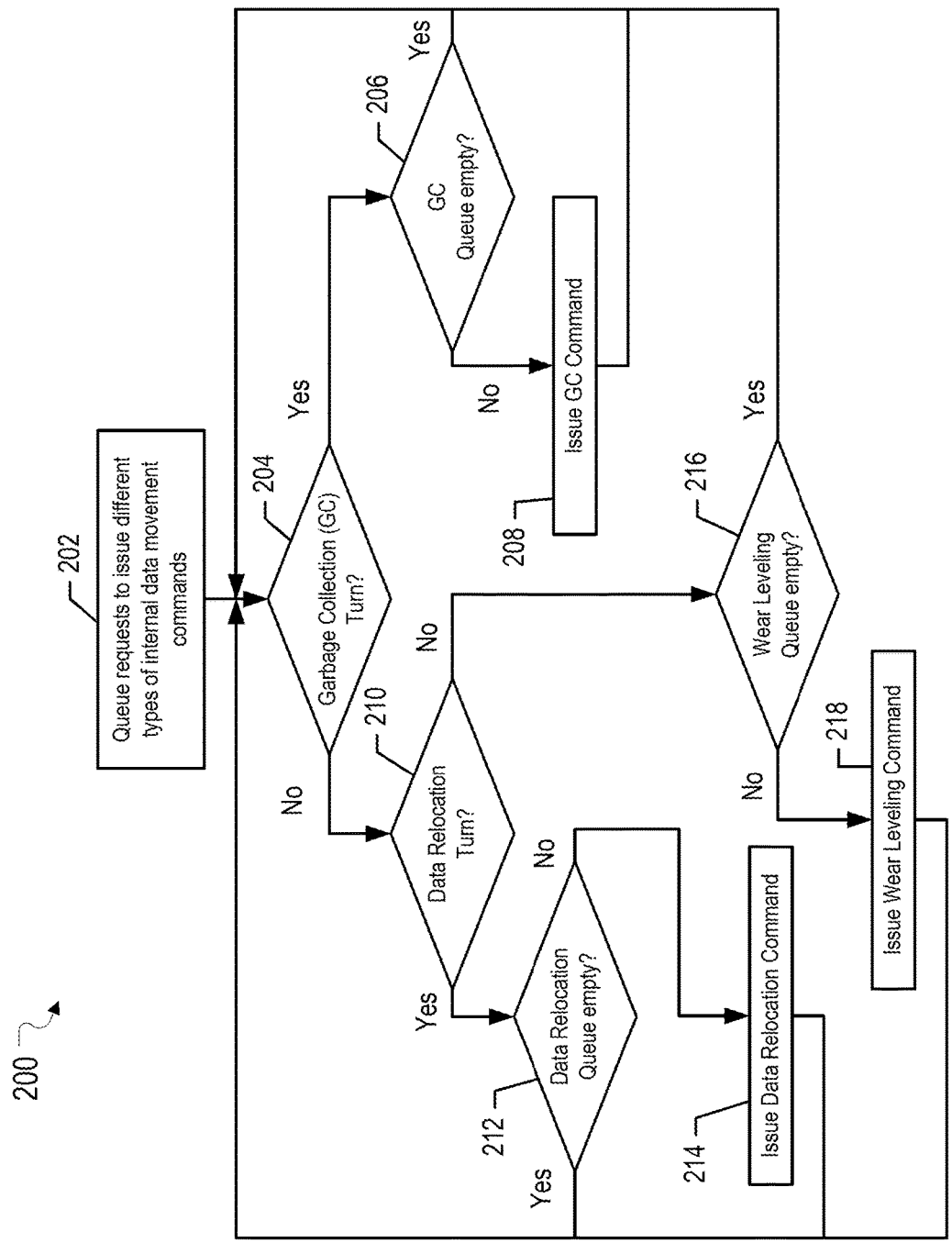
FIG. 2 illustrates a flow diagram of an example process of priority-based internal data movement in accordance with one or more implementations.

FIG. 2 illustrates a flow diagram of an example process 200 of priority-based internal data movement in accordance with one or more implementations. For explanatory purposes, the example process 200 is described herein with reference to the controller 114 of FIG. 1; however, the example process 200 is not limited to the controller 114 of FIG. 1, and one or more blocks of the example process 200 may be performed by one or more other components of the controller 114. Further for explanatory purposes, the blocks of the example process 200 are described herein as occurring in serial, or linearly. However, multiple blocks of the example process 200 may occur in parallel. In addition, the blocks of the example process 200 need not be performed in the order shown and/or one or more of the blocks of the example process 200 need not be performed. For purposes of explanation of the subject technology, the process 200 will be discussed in reference to FIG. 3.

Figure 3:
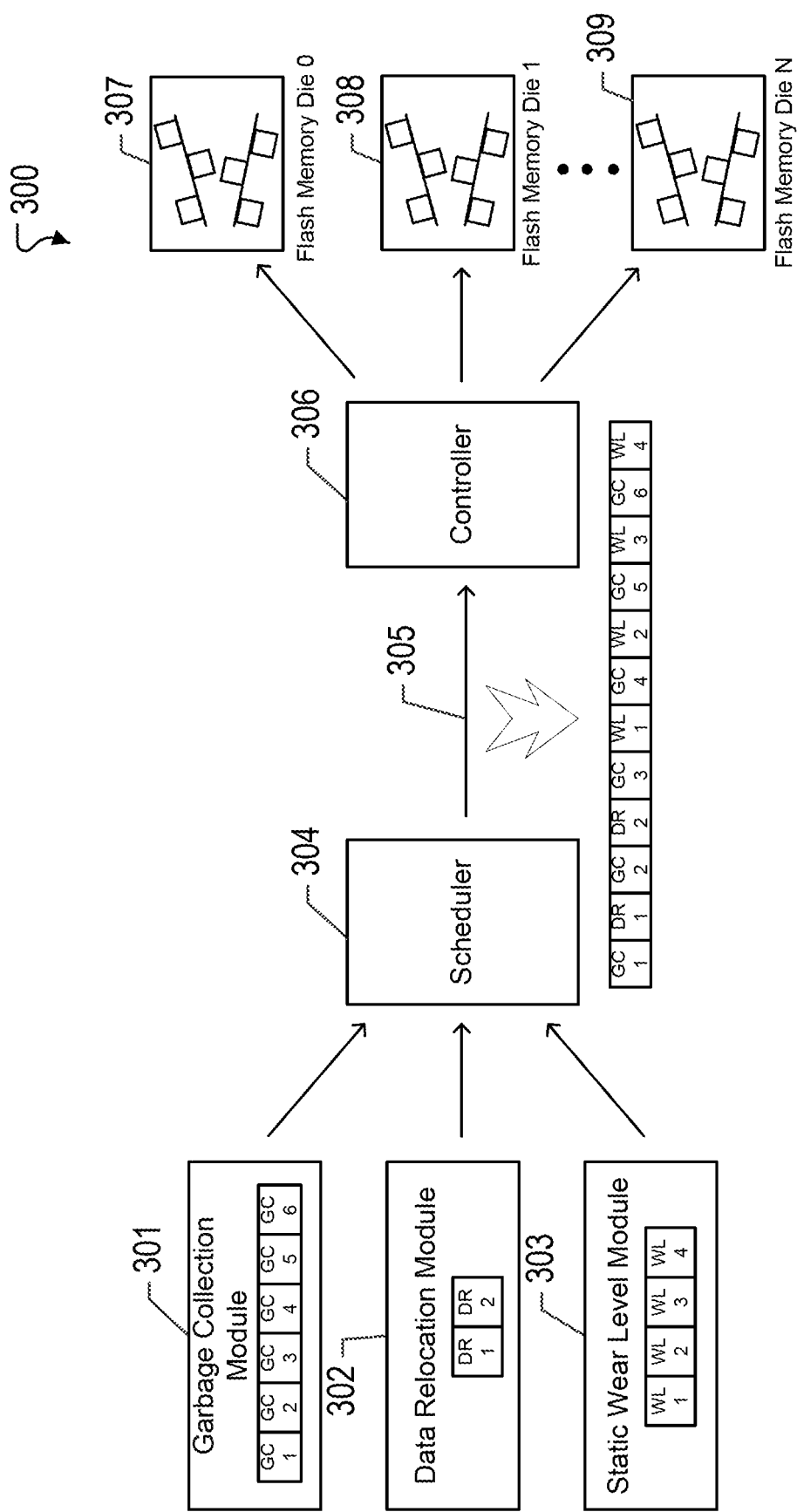
FIG. 3 illustrates an example of a system for priority-based internal data movement in accordance with one or more implementations.

FIG. 3 illustrates an example of a system 300 for priority-based internal data movement in accordance with one or more implementations. The system 300 includes a data storage device (e.g., 110) that provides priority-based internal data movement. The data storage device includes at least one processor that is configured to queue requests associated with different types of internal data movement commands. In some aspects, the internal data movement command types are queued by a single processing core. In other aspects, the internal data movement command types are queued by respective processing cores. For example, a garbage collection module 301 having the garbage collection engine 116 is a processing core executing firmware tasked to handle garbage collection requests. In another example, a data relocation module 302 having the data relocation engine 117 is a processing core executing firmware tasked to handle data relocation requests. In another example, a wear level module 303 having the wear level engine 118 is a processing core executing firmware tasked to handle wear level requests.

In one or more aspects, each of the requests is queued into one of the queues. Referring back to FIG. 2, the example process 200 begins where requests to issue different internal data movement command types are queued in respective command queues (202). For example, the garbage collection module 301 may include a garbage collection command queue that queues garbage collection requests as they are issued by the garbage collection engine 116. In another example, the data relocation module 302 may include a data relocation command queue that queues data relocation requests as they are issued by the data relocation engine 117.

In another example, the wear level module 303 may include a wear level command queue that queues wear level requests as they are issued by the wear level engine 118.

The scheduler 304 having the scheduling engine 115 is configured to identify a turn among the internal data movement command types based on a prioritization of the internal data movement command types. For example, the garbage collection requests are serviced in every other turn of the prioritized schedule, and handled in round robin order with other types of requests. The scheduler 304 can service either the data relocation requests from the data relocation command queue or the wear level requests from the wear level command queue in the alternating turns of the prioritized schedule. However, the wear level request may not be serviced until all data relocation requests are first serviced (or the data relocation command queue is empty).

The scheduler 304 traverses the prioritized schedule and identifies a turn in the prioritized schedule. In this respect, the scheduler 304 selects one of the queues based on the identified turn. For example, the scheduler 304 may schedule commands from the garbage collection command queue in the garbage collection module 301, the data relocation command queue in the data relocation module 302, or the wear level command queue in the wear level module 303. Once a queued request has been identified by the scheduler 304, the scheduler 304 then issues one of the internal data movement command types associated with one of the queued requests. For example, at the start of the scheduling algorithm, the scheduler 304 may select a request from the garbage collection command queue and issue a garbage collection read command to one of the flash memory circuits 307-309 (e.g., flash memory die 0-N) via a processing core of the controller 306.

Referring back to FIG. 2, the scheduler 304 determines whether it is a turn to issue a garbage collection command (204). If it is determined that it is not the turn for the garbage collection command, then the process 200 proceeds to step 210. Otherwise, the process proceeds to step 206, where the scheduler 304 determines whether the garbage collection command queue is empty. If the garbage collection command queue is not empty, then the scheduler 304 schedules the garbage collection command for issuance (208). Otherwise, the scheduler 304 returns to step 204 to determine a next turn. After scheduling the garbage collection command for issuance, the scheduler 304 also returns to step 204.

At 210, the scheduler 304 determines whether it is a turn to issue a data relocation command. If it is determined that it is not the turn for the data relocation command, then the process 200 proceeds to step 216. Otherwise, the process proceeds to step 212, where the scheduler 304 determines whether the data relocation command queue is empty. If the data relocation command queue is not empty, then the scheduler 304 schedules the data relocation command for issuance (214). Otherwise, the scheduler 304 returns to step 204 to determine a next turn. After scheduling the data relocation command for issuance, the scheduler 304 also returns to step 204.

At 216, the scheduler 304 determines whether the wear leveling command queue is empty. If the wear leveling command queue is not empty, then the scheduler 304 schedules the wear leveling command for issuance (218). Otherwise, the scheduler 304 returns to step 204 to determine a next turn. After scheduling the wear leveling command for issuance, the scheduler 304 also returns to step 204.

In FIG. 3, the garbage collection command queue of the garbage collection module 301 includes multiple queued garbage collection requests (e.g., GC1-GC6). The data relocation command queue of the data relocation module 302 includes multiple queued data relocation requests (e.g., DR1, DR2). Also, the wear level command queue of the wear level module 301 includes multiple queued wear level requests (e.g., WL1-WL6).

In one or more implementations, the scheduler 304 may initiate the scheduling algorithm by first scanning the garbage collection command queue, and then issue a garbage collection read command (e.g., GC1). In the next turn of the prioritized schedule, the scheduler 304 scans the data relocation command queue and identifies a data relocation request to then issue a data relocation read command (e.g., DR1). In the subsequent turn of the prioritized schedule, the scheduler 304 returns to the garbage collection command queue to identify the next queued request and issues a second garbage collection read command (e.g., GC2). In the next turn of the prioritized schedule, the scheduler 304 returns to the data relocation command queue and identifies another data relocation request to then issue a second data relocation read command (e.g., DR2). In the next turn, the scheduler 304 returns to the garbage collection command queue to identify the next queued request and issues a third garbage collection read command (e.g., GC3). The next turn directs the scheduler 304 back to the data relocation command queue, however, all of the data relocation requests in the data relocation command queue have been serviced (e.g., DR1, DR2). Accordingly, the scheduler 304 then scans the wear level command queue to identify a first wear level request to then issue a first wear level read command (e.g., WL1). This round robin process between the garbage collection requests and the wear level requests will continue given that all data relocation requests have already been serviced by the scheduler 304. For this example, the sequence of commands that are issued to the processing core of the controller 306 appears as follows: GC1, DR1, GC2, DR2, GC3, WL1, GC4, WL2, GC5, WL3, GC6, WL4. With this approach, the garbage collection requests are given enough priority to ensure continuous operation of the data storage device 110. At the same time, the data relocation requests and the wear leveling requests are given consideration to ensure endurance of the data storage device 110.

In some aspects, the scheduler 304 maintains a state machine to track the state of each block (or block set). In this respect, a block in a certain state (e.g., a state corresponding to garbage collection) may not be accessible by another engine (e.g., data relocation engine 117, wear level engine 118) to perform a different type of internal data movement until the operation being performed on the identified block (or block set) is complete. In this respect, the state of the block (or block set) is changed to a ready state or another default state indicating that the block (or block set) is available. In this respect, the scheduler 304 determines which blocks (or block sets) in the flash memory circuits 307-309 are associated with the queued request. The scheduler 304 then assigns a state to the determined blocks (or block sets). In some aspects, the state indicates the type of internal data movement command being issued. The garbage collection module 301, the data relocation module 302, and the wear level module 303 can each access the state information of a block (or block set) before deciding to issue a read/write command to that block (or block set).

Figure 4:
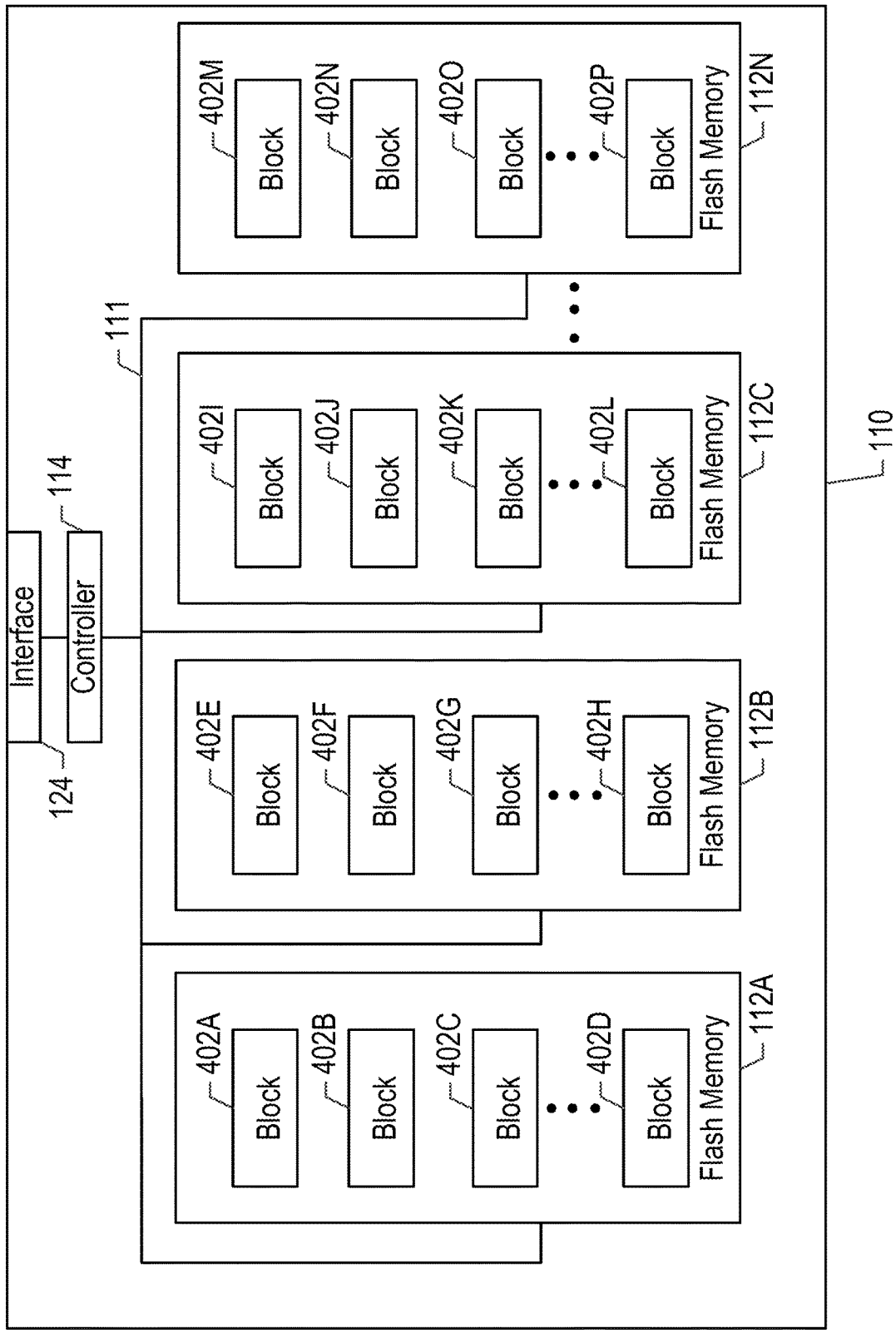
FIG. 4 illustrates example non-volatile memory circuits distributed across different channels in an example data storage device in accordance with one or more implementations.

FIG. 4 illustrates example non-volatile memory circuits distributed across different channels in an example data storage device 110 in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example data storage device 110 includes the interface 124, the controller 114, the channels 113A-113N, and one or more flash memory circuits 112A-N. The flash memory circuits 112A-N each include one or more physical blocks (e.g., 302A-P) of flash memory, which may also be referred to as blocks and are discussed further below with respect to FIG. 5.

In some aspects, after the flash memory circuit 112A receives the data, the flash memory circuit 112A may be in a busy state during which the flash memory circuit 112A may not receive any additional read and/or write commands. Thus, the number of the flash memory circuits 112A-N that are simultaneously in the busy state may limit the data storage device 110. The other channels 113B-N may operate in a similar fashion.

For explanatory purposes, the data storage device 110 of FIG. 4 is illustrated as including four channels 113A-N, and each of the channels 113A-N is illustrated as being communicatively coupled to the flash memory circuits 112A-N. However, the data storage device 110 may include any number of channels, such as 8, 16, and 32. Similarly, each of the channels 113A-N may be communicatively coupled to any number of the flash memory circuits 112A-N, such as an arbitrary number. In one or more implementations, one or more of the channels 113A-N may be communicatively coupled to different numbers of the flash memory circuits 112A-N.

Figure 5:
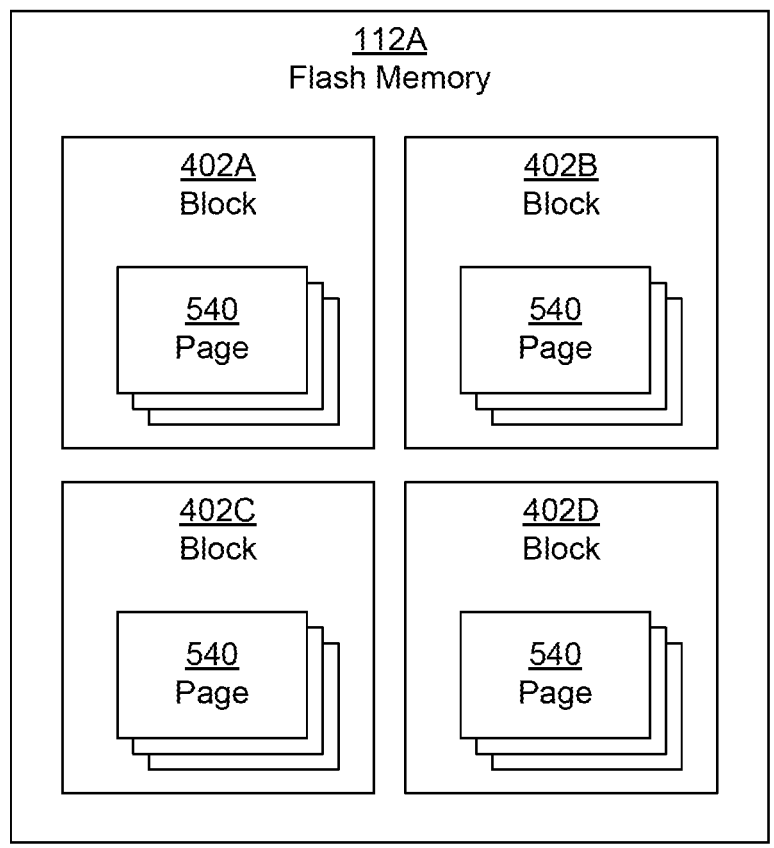
FIG. 5 illustrates example blocks of a non-volatile memory circuit in an example data storage device in accordance with one or more implementations.

FIG. 5 illustrates example blocks of non-volatile memory circuits distributed across different channels in an example data storage device 110 in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

For explanatory purposes, the data storage device 110 of FIG. 4 is illustrated as including a flash memory circuit 112A. The flash memory circuits 112A includes one or more physical blocks 202A-D of flash memory, which may also be referred to as blocks 202A-D. Each of the blocks 202A-D may include one or more physical pages 402A-D of flash memory. The individual physical pages 402A-D of the blocks 202A-D may be the smallest unit that can be written to in the flash memory circuits 112A-N and may be, for example, 8-16 kilobytes in size. In one or more implementations, a flash memory circuit 112A may be 16 Gigabytes in size and may include 4,252 blocks each of which includes 256 pages with each page storing 17,760 bytes.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an implementation, the implementation, another implementation, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any implementation described herein as "exemplary" or as an "example" is not necessarily to be construed as preferred or advantageous over other implementations. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
   storing requests into queues, each of the requests associated with one of data movement command types, wherein the data movement command types comprise a garbage collection command type, a data relocation command type, and a wear leveling command type;
   selecting one of the queues based on a prioritization of the data movement command types; and
   transferring, to non-volatile memory, one of the requests associated with the selected one of the queues, wherein the one of the requests is associated with a respective one of the data movement command types,
   wherein the prioritization comprises: arranging the data relocation command type and the wear leveling command type into a group; selecting one of the group or the garbage collection command type; and when the group is selected, providing a priority to select the data relocation command type within the group.

2. The method of claim 1, further comprising: determining that the selected one of the queues comprises the one of the requests associated with the respective one of the data movement command types.

3. The method of claim 1, wherein providing the priority to select the data relocation command type within the group comprises: selecting the wear leveling command type only after all of one or more of the queues associated with the data relocation command type are empty.

4. The method of claim 1, wherein selecting the one of the group or the garbage collection command type comprises: selecting the one of the group or the garbage collection command type in a round robin process.

5. The method of claim 1, comprising:
   determining whether a turn in the prioritization indicates the garbage collection command type or the group for selection, wherein a first queue of the queues is configured to store a request of the garbage collection command type, wherein a second queue of the queues is configured to store a request of the data relocation command type, and wherein a third queue of the queues is configured to store a request for the wear leveling command type.

6. The method of claim 5, comprising:
determining that a first turn in the prioritization does not indicate the garbage collection command type, the first turn indicating the data relocation command type;
determining whether the second queue includes at least one request of the data relocation command type; and
providing the at least one request of the data relocation command type for issuance to the non-volatile memory when it is determined that the second queue includes the at least one request of the data relocation command type.

7. The method of claim 6, comprising:
identifying a second turn in the prioritization when it is determined that the second queue does not include the at least one request of the data relocation command type, the second turn indicating the garbage collection command type;
determining whether the first queue includes at least one request of the garbage collection command type; and
providing the at least one request of the garbage collection command type for issuance to the non-volatile memory when it is determined that the first queue includes the at least one request of the garbage collection command type.

8. The method of claim 7, comprising:
identifying a third turn in the prioritization when it is determined that the first queue does not include the at least one request of the garbage collection command type, the third turn indicating the wear leveling command type;
determining whether the third queue includes at least one request of the wear leveling command type;
providing the at least one request of the wear leveling command type for issuance to the non-volatile memory when it is determined that the third queue includes the at least one request of the wear leveling command type; and
identifying a fourth turn in the prioritization when it is determined that the third queue does not include the at least one request of the wear leveling command type, the fourth turn indicating the garbage collection command type, the fourth turn being subsequent to the third turn.

9. A data storage device, comprising:
queues;
non-volatile memory; and
a controller configured to cause:
storing requests into the queues, each of the requests associated with one of data movement command types, wherein the data movement command types comprise a garbage collection command type, a data relocation command type, and a wear leveling command type;
selecting one of the queues based on a prioritization of the data movement command types; and
transferring, to the non-volatile memory, one of the requests associated with the selected one of the queues, wherein the one of the requests is associated with a respective one of the data movement command types,
wherein the prioritization comprises: aggregating the data relocation command type and the wear leveling command type into a group; selecting one of the group or the garbage collection command type; and when the group is selected, providing a priority to select the data relocation command type within the group.

10. The data storage device of claim 9, wherein the controller is configured to cause determining that the selected one of the queues comprises the one of the requests associated with the respective one of the data movement command types.

11. The data storage device of claim 9, wherein providing the priority to select the data relocation command type within the group comprises: selecting the wear leveling command type only after all of one or more of the queues associated with the data relocation command type are empty.

12. The data storage device of claim 9, wherein selecting the one of the group or the garbage collection command type comprises: selecting the one of the group or the garbage collection command type in a round robin process.

13. The data storage device of claim 9, wherein the controller is configured to cause:
determining whether a turn in the prioritization indicates the garbage collection command type or the group for selection, wherein a first queue of the queues is configured to store a request of the garbage collection command type, wherein a second queue of the queues is configured to store a request of the data relocation command type, and wherein a third queue of the queues is configured to store a request for the wear leveling command type.

14. The data storage device of claim 13, wherein the controller is configured to cause:
determining that a first turn in the prioritization does not indicate the garbage collection command type, the first turn indicating the data relocation command type;
determining whether the second queue includes at least one request of the data relocation command type; and
providing the at least one request of the data relocation command type for issuance to the non-volatile memory when it is determined that the second queue includes the at least one request of the data relocation command type.

15. The data storage device of claim 14, wherein the controller is configured to cause:
identifying a second turn in the prioritization when it is determined that the second queue does not include the at least one request of the data relocation command type, the second turn indicating the garbage collection command type;
determining whether the first queue includes at least one request of the garbage collection command type; and
providing the at least one request of the garbage collection command type for issuance to the non-volatile memory when it is determined that the first queue includes the at least one request of the garbage collection command type.

16. The data storage device of claim 15, wherein the controller is configured to cause:
identifying a third turn in the prioritization when it is determined that the first queue does not include the at least one request of the garbage collection command type, the third turn indicating the wear leveling command type;
determining whether the third queue includes at least one request of the wear leveling command type;
providing the at least one request of the wear leveling command type for issuance to the non-volatile memory when it is determined that the third queue includes the at least one request of the wear leveling command type; and
identifying a fourth turn in the prioritization when it is determined that the third queue does not include the at least one request of the wear leveling command type, the fourth turn indicating the garbage collection command type, the fourth turn being subsequent to the third turn.

17. A system, comprising:

means for storing requests into queues, each of the requests associated with one of data movement command types, wherein the data movement command types comprise a garbage collection command type, a data relocation command type, and a wear leveling command type;

means for selecting one of the queues based on a prioritization of the data movement command types; and means for transferring, to non-volatile memory, one of the requests associated with the selected one of the queues, wherein the one of the requests is associated with a respective one of the data movement command types, wherein the prioritization comprises: arranging the data relocation command type and the wear leveling command type into a group; selecting one of the group or the garbage collection command type; and when the group is selected, providing a priority to select the data relocation command type within the group.

18. The system of claim 17, further comprising: means for determining that the selected one of the queues comprises the one of the requests associated with the respective one of the data movement command types.

19. The system of claim 17, wherein providing the priority to select the data relocation command type within the group comprises: selecting the wear leveling command type only after all of one or more of the queues associated with the data relocation command type are empty.

20. The system of claim 17, wherein selecting the one of the group or the garbage collection command type comprises: selecting the one of the group or the garbage collection command type in a round robin process.

* * * * *